United States Patent [19]

Ufland

[11] Patent Number: 4,720,008
[45] Date of Patent: Jan. 19, 1988

[54] CONVEYOR ASSEMBLY

[75] Inventor: Jared E. Ufland, Thousand Oaks, Calif.

[73] Assignee: National Conveyor Corporation, North Hollywood, Calif.

[21] Appl. No.: 642,067

[22] Filed: Aug. 17, 1984

[51] Int. Cl.⁴ ............................................. B65G 17/00
[52] U.S. Cl. ..................................... 198/841; 198/836
[58] Field of Search ............... 198/841, 852, 831, 837, 198/324, 834, 836, 850, 851, 853, 860.1, 860.2, 860.3, 861.1, 861.2, 861.3

[56] References Cited

U.S. PATENT DOCUMENTS

| | | | |
|---|---|---|---|
| 872,457 | 12/1907 | Russel | 198/324 |
| 986,753 | 3/1911 | Plummer | 198/837 |
| 1,089,306 | 3/1914 | Bell | 198/841 |
| 2,292,284 | 8/1942 | Ogden | 198/841 |
| 3,529,715 | 9/1970 | Mueller | 198/852 |
| 3,669,247 | 6/1972 | Pulver | 198/841 |
| 3,788,455 | 1/1974 | Dieckmann, Jr. | 198/841 |
| 3,876,061 | 4/1975 | Hammitt | 198/850 X |
| 3,964,800 | 6/1976 | Grimes et al. | 198/841 X |
| 4,084,687 | 4/1978 | Lapeyre | 198/850 X |
| 4,164,283 | 8/1979 | Flajnik | 198/841 |
| 4,222,482 | 9/1980 | Kelley | 198/841 |
| 4,518,303 | 5/1985 | Moser | 198/841 X |

FOREIGN PATENT DOCUMENTS 2451025 4/1976 Fed. Rep. of Germany.

Primary Examiner—Joseph E. Valenza
Assistant Examiner—Lyle Kimms
Attorney, Agent, or Firm—Herzig & Yanny

[57] ABSTRACT

A conveyor assembly for use with conveyor belt systems of the type utilizing articulated links having downwardly extending opposed feet. The conveyor assembly includes a guide ramp for supporting the conveyor belt and guiding it to a drive sprocket. The guide ramp has a horizontal leading end and a downwardly inclined trailing end. The opposed feet of the conveyor belt are supported within a clearance between two sides of the guide ramp. Due to the incline on the ramp the drive sprocket may be lowered allowing implementation of a coverplate at the same height as the main, horizontal section of the conveyor belt. Use of this coverplate protects the operator and prevents items being transported on the conveyor belt from falling into the drive bed of the conveyor assembly.

9 Claims, 7 Drawing Figures

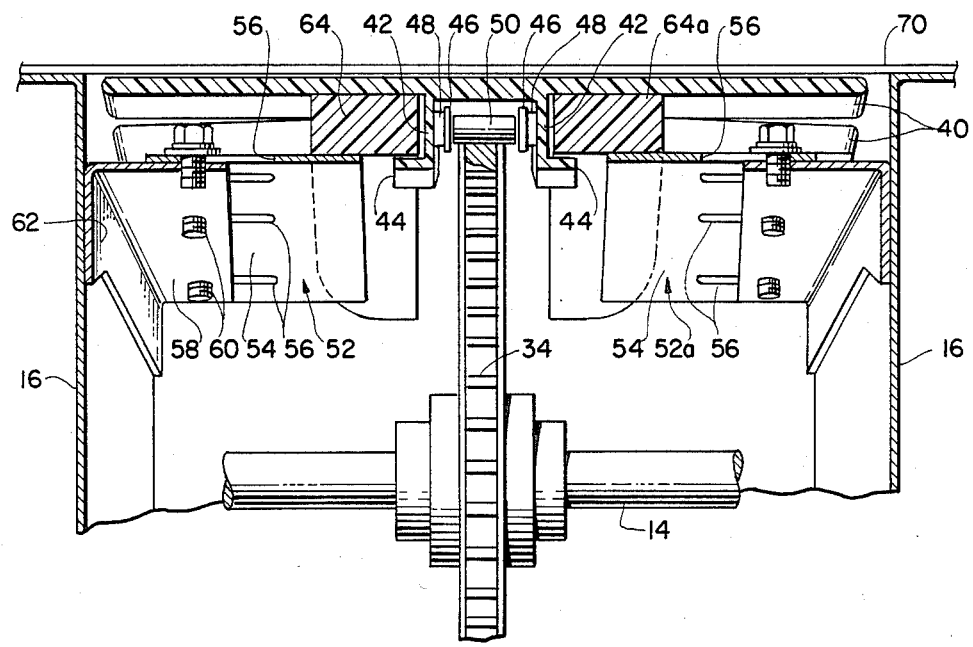
FIG. 4.
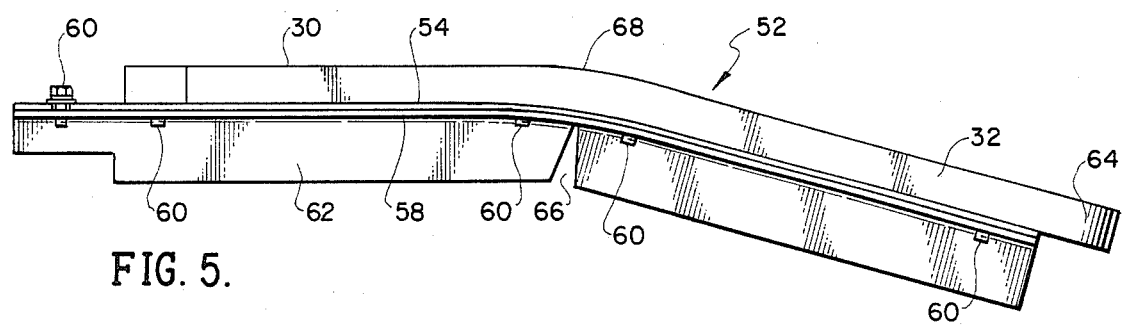
FIG. 5.
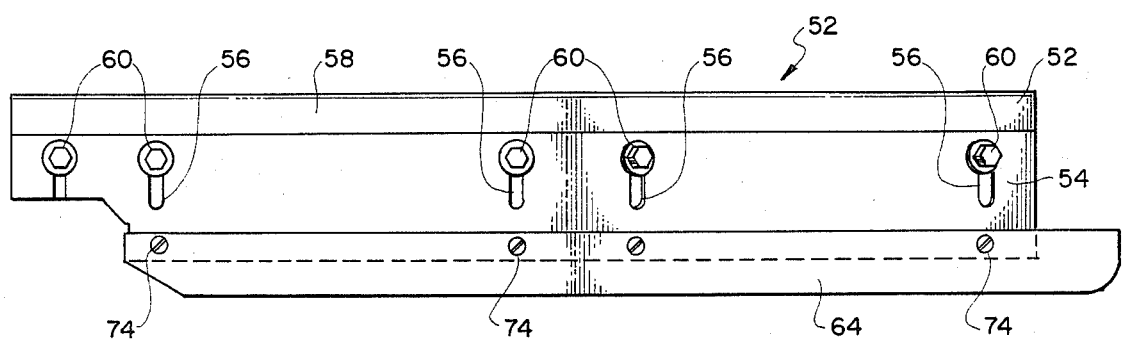
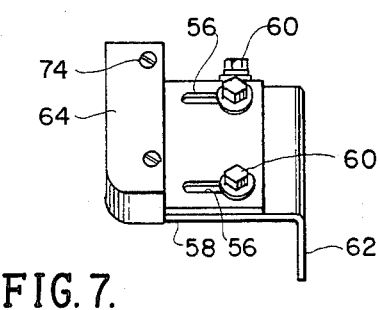
FIG. 6.
FIG. 7.

CONVEYOR ASSEMBLY

BACKGROUND OF THE INVENTION

The present invention relates generally to conveyor belt systems, utilizing articulated links, and more particularly an improvement in the guiding mechanism for the conveyor belt.

Articulated link conveyor belts are comprised of interengaged individual links and are commonly used in cafeterias for food service. In known constructions of conveyor belt systems, the conveyor belt, in its upper flight track, is supported by a guide ramp with a horizontal upper surface. The belt is driven by a sprocket which is at a height such that the individual links travel along a horizontal plane until reaching a point directly above the central axis of the sprocket. The links, traveling horizontally engage the sprocket and descend downwardly and around the sprocket.

This prior art design necessitates the absence of any cover above the belt. As a result, silverware or other small objects traveling on the conveyor belt may easily fall into the mechanism creating damage and/or a hazard to the operator attempting to retrieve the item. In addition, operators are often required to move very quickly while removing items from the conveyor belt. The sprocket, at this location, creates a danger to a fast moving operator removing items from the belt.

SUMMARY OF THE INVENTION

The present invention provides for a partially inclined guide ramp for the upper flight track of a conveyor belt assembly. In the present invention a guide ramp is provided which becomes downwardly inclined from the normally horizontal conveying height at positions sufficiently upstream of the drive sprocket of the conveyor belt so that the sprocket may be maintained at a position substantially lower than the height of the main body of the horizontal section of the conveyor belt. The lowering of the sprocket allows for application of a coverplate over the sprocket at a height substantially equivalent to the height of the horizontal section of the conveyor belt.

With this arrangement, the operators hands and fingers are, at all times, protected from the driving mechanism of the conveyor belt. Furthermore, small items not promptly removed from the conveyor belt merely slide onto the coverplate and are unable to contact the drive mechanism.

Other features and advantages of this invention will appear as the following description proceeds.

BRIEF DESCRIPTION OF THE DRAWINGS

A better understanding of the present invention may be had from consideration from the following detailed description taken in conjunction with the following drawings in which:

FIG. 4 is a rear end elevational view of the conveyor assembly, partially in cross section;

FIG. 5 is a side view of one side of the conveyor guide ramp;

FIG. 6 is a top plan view of one side of the conveyor guide ramp; and

FIG. 7 is a front end view of one side of the conveyor guide ramp.

DETAILED DESCRIPTION OF THE PREFERRED EMBODIMENT

System Arrangement

Figure 1:
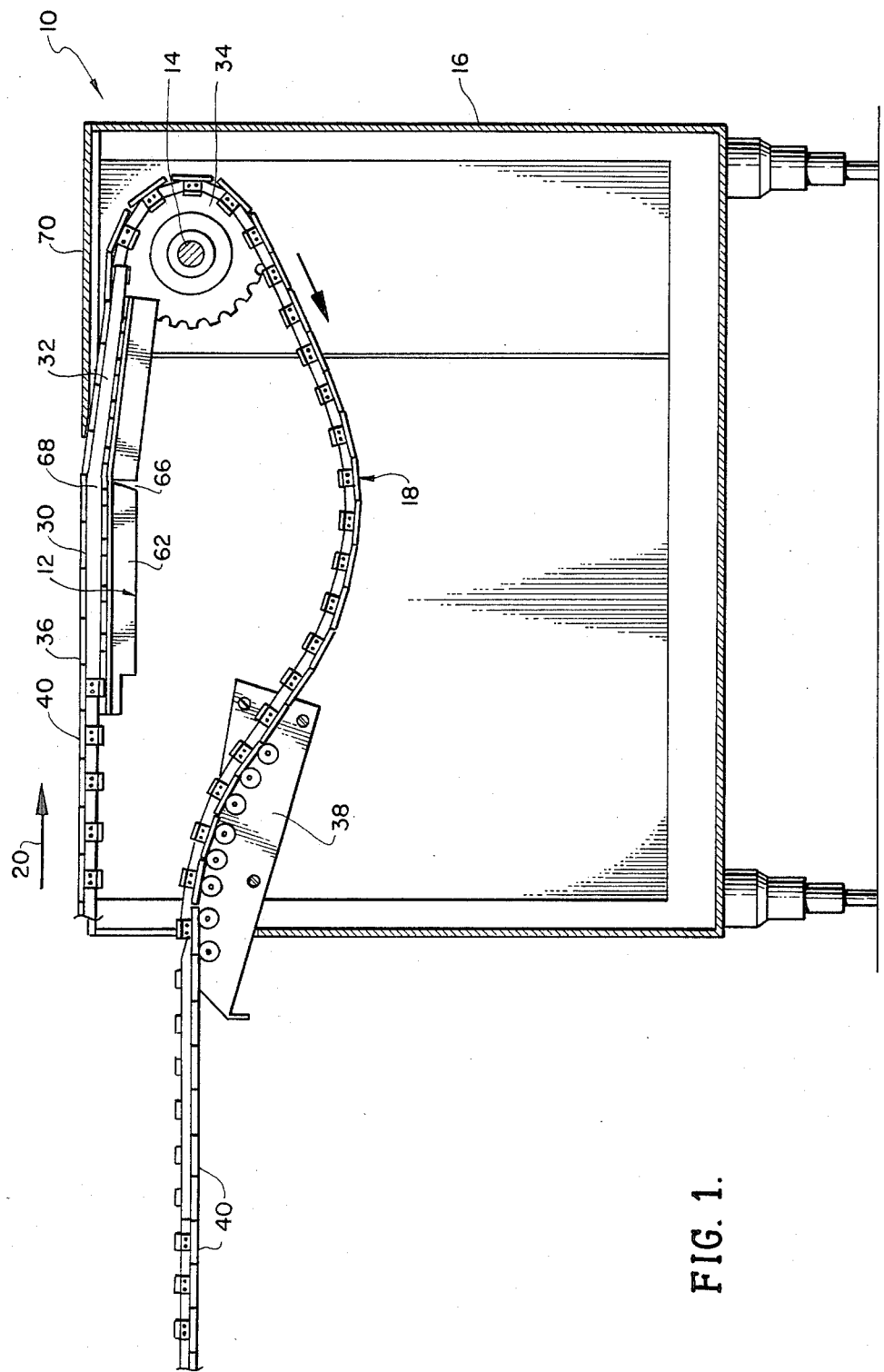
FIG. 1 is a side elevational view of the conveyor assembly.

Referring to the drawings and to the characters of reference marked hereon, FIG. 1 is side elevational view of the conveyor assembly designated generally as 10. The conveyor assembly 10 includes a stationary guide ramp 12 and a rotatable shaft 14 supported by a stationary framework 16.

Figure 2:
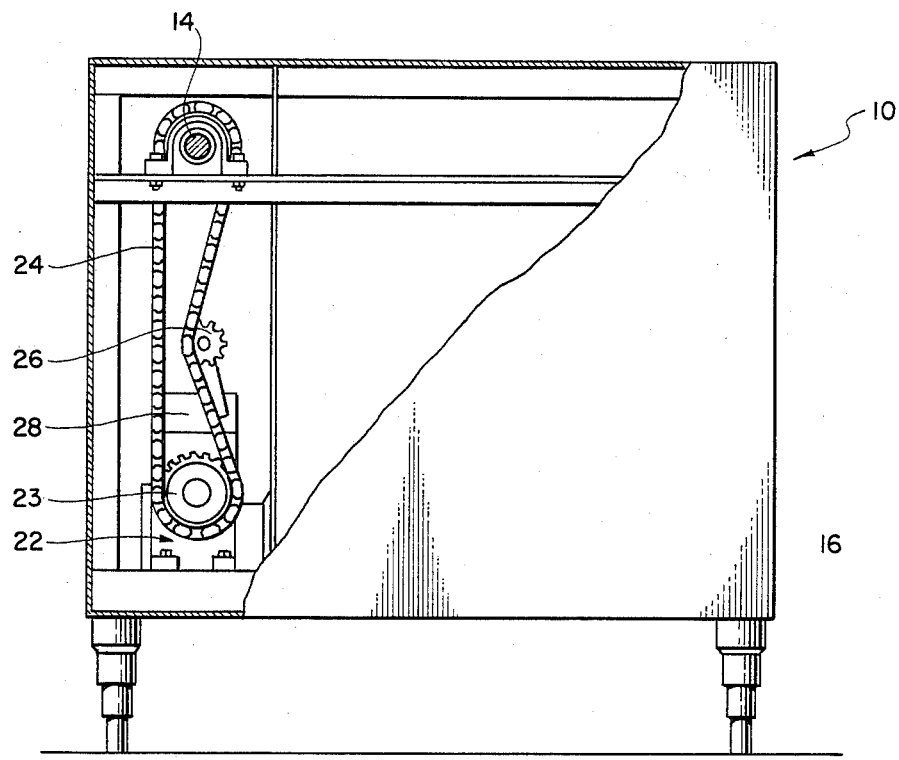
FIG. 2 is a side elevational view of the framework for the conveyor assembly, partially cutaway to show the motor and drive mechanism for the conveyor belt sprocket.
Figure 3:
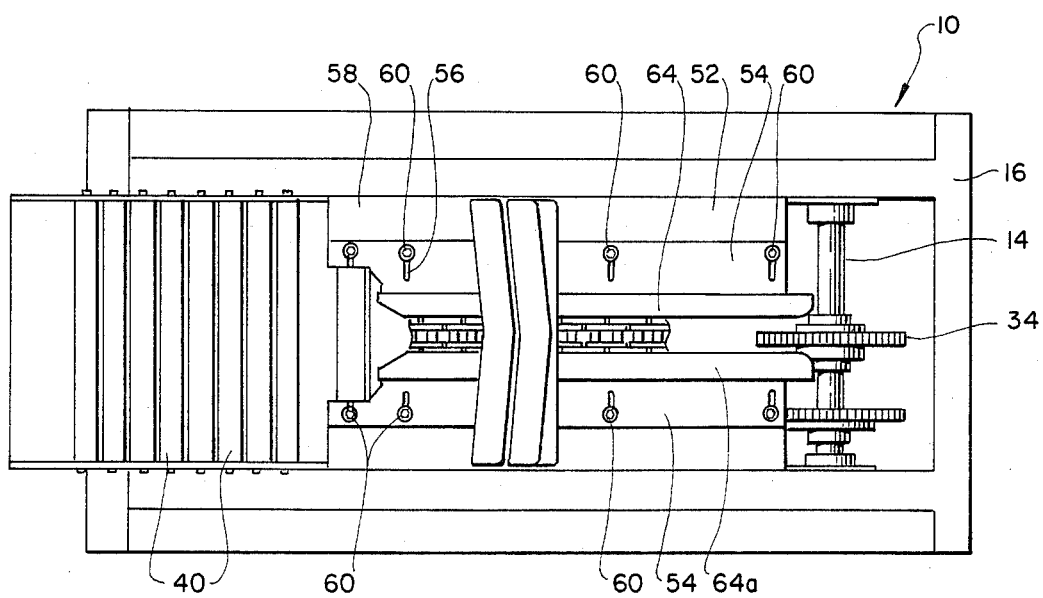
FIG. 3 is a top plan view of the conveyor guide assembly showing individual links of the conveyor belt.

The rotatable shaft 14 drives the conveyor belt shown generally at 18, in the direction of the arrow 20. The shaft 14 is driven by a motor 22 located beneath the shaft. The cutaway elevational view of FIG. 2 illustrates the motor 22 with associated drive train 24. An adjusting sprocket 26 is attached to the housing 28 of the motor 22 to compensate for variations in the length of the drive train 24.

The upper flight conveyor guide ramp 12 (more fully discussed below) has a horizontal leading section 30 and a downwardly sloped trailing section 32. The conveyor belt 18 is led by the guide 12 to a central sprocket 34 on the drive shaft 14. The central sprocket 34 is located at a height so that the uppermost sprocket teeth are substantially lower than the horizontal surface 36 of the leading section 30 of the conveyor guide. In the preferred embodiment the uppermost sprocket teeth are approximately 3 inches lower than the horizontal surface 36.

A lower flight conveyor guide 38 is attached to the frame 16 as shown in FIG. 1 to lead the conveyor belt back to the rear end of the conveyor assembly.

Conveyor Links

The guide assembly is designed to use articulated conveyor links 40 of the slat type. Each link 40 is preferably cast of a strong metal or molded of a tough plastic. As shown in FIG. 4, each link 40 has a pair of downwardly extending opposed feet 42 with outwardly extending projections 44.

Wear strips 64, 64a attached to the upper flight conveyor guide ramp provide a guide path for the feet 42 as more fully discussed below.

Each pair of feet 42 depend from the top plates 46, 48 at each side of the chain 50 and are provided with sockets (not shown) fitting over the projecting ends of the chain link pivot pins (not shown) in a manner constituting cooperating interlocking abutments. With each link 40 securely interlocked with the link on either side, the conveyor belt moves as one integral unit.

When it is desired to remove a link 40 from the chain, unlocking is effected by prying the feet outwardly to deflect them sufficiently to permit disengaging of the interlocking abutments.

Conveyor Guide Ramp

The upper flight conveyor guide ramp 12 is comprised of two opposed elongated guide sections 52, 52a as illustrated in FIGS. 4 and 5. Each guide section has a central metal plate 54 approximately 3/32 inch thick and 3 inches wide. The central plate 54 is provided with a plurality of lateral slots 56.

The slots 56 provide means for bolting an outer metal plate 58 of similar thickness and length of the central plate 54 to the central plate. In the preferred embodiment, as illustrated in FIG. 5, five bolts 60 are utilized for attaching the central plate to the outer plate. The outer plate 58 is bent downwardly at a 90° angle to form a side plate 62 which is welded to vertical walls of the frame 16 of the conveyor assembly 10 (see FIG. 4). The outer plate 58 projects outwardly from the central plate 54.

A wear strip 64 which, in the preferred embodiment, is formed of ultrahigh molecular weight linear polypropylene is secured by bolts 74 to the side of the central plate 54 opposite the outer plate 58 so that the wear strip 64 projects inwardly from the central plate. The wear strip 64 has a rectangular cross section as illustrated in FIG. 4. As previously noted, the clearance between the wear strips 64, 64a provide a guide path for the feet 42 of the conveyor links 40. The feet 42 travel between the associated pair of wear strips 64, 64a. The width of the guide ramp 12, as an integral unit, may be adjusted by the bolts 60 within the slots 56 of the central plate 54. These adjustments are necessary to compensate for varying widths of the frame 16 or the distance between feet 42.

As previously noted, the leading section 30 of the conveyor guide ramp 12 is horizontal. At its midlength the guide ramp 12 is sloped downwardly at an angle of approximately 15°. The central and outer metal coverplates may be bent to the appropriate angle during construction of the guide ramp. The wear strip 64 must be molded to the appropriate angle. A notch 66 in the side plate 62 is provided (see FIG. 5) to allow bending of the outer plate 58 during construction of the guide ramp.

Operation

During the operation of the conveyor assembly the individual links 40 of the conveyor belt move horizontally along the leading section 30 of the conveyor guide ramp 12. At the edge 68 of the leading section 30 the ramp becomes inclined. At that point any items being transported by the conveyor belt 18 and not removed are urged onto and slid across a horizontal coverplate 70 attached to the frame 16. The coverplate 70 is located at substantially the same height as the surface of the conveyor links 40 prior to their descent on the inclined surface 32. The coverplate 70 may be fitted very close to edge 68 so that only a clearance of approximately ⅛ inch exists between the coverplate 70 and the surface of the conveyor belt 18.

The coverplate 70 is useful for collecting items left on the conveyor belt but unable to be retrieved by the operator prior to their reaching the inclined surface 32. Furthermore, no holes exist within the present conveyor assembly. In conventional assemblies, where the sprocket is raised, and therefore a coverplate is unable to be implemented, problems are created when items occasionally fall into the conveyor bed.

In the present invention the coverplate 70 is screwed (not shown) onto frame 16 and may be easily removed to service the central sprocket 34 for the conveyor belt, the drive sprocket 23 of the motor 22, or the drive train 24.

While the invention shown and described herein has been well adapted to fulfill the objects and advantages previously mentioned as desirable, it is to be understood that the invention is not limited to the specific feature shown and described but that the means and configuration herein disclosed are susceptible of modification in form, proportion, and arrangement of parts without departing from the principle involved or sacrificing any of its advantages and the invention is therefore claimed in embodiments of various forms all coming within the scope of the claims which follow.

What is claimed:

1. A conveyor assembly for articulated link conveyor, comprising:

a stationary frame;

an elongated guide ramp securely supported by said frame for guiding conveyor links of a slat type on an upper flight track of the conveyor assembly, said guide ramp having a generally horizontal leading section and a downwardly inclined trailing section, said guide ramp comprising:

(a) an opposed pair of outer plates, each outer plate having a first horizontal side and a second side bent at substantially 90° wherein each second side is securely attached to a respective sidewall of said frame;

(b) an opposed pair of central plates, each central plate having a first and a second side, said first side adjustably attached to the first side of an associated outer plate; and (c) an opposed pair of wear strips, each wear strip attached to the second side of the associated central plate whereby a clearance provided between said wear strips provides a guide path for said conveyor links;

a sprocket mounted on said frame for driving the conveyor links, said sprocket having teeth such that the uppermost position of said teeth are at a location substantially lower than the horizontal surface of said leading section;

a drive mechanism providing drive means for said sprocket; and protective and supporting means operably associatable with said guide ramp for preventing items being transported on the conveyor links from falling into said drive mechanism and for protecting the operator's hands and fingers.

2. The conveyor assembly as defined in claim 1, wherein the protective and supportive means includes a coverplate substantially on the same plane as the links being horizontally guided by the leading section of the guide ramp, said coverplate supported by the frame and separated from the conveyor links by a small clearance, at a point where the leading section meets the trailing section, so that when items descend from the horizontal leading section they are urged onto said coverplate.

3. The conveyor assembly as defined in claim 2, wherein each of said central plates includes a plurality of lateral slots for insertion of bolts for adjustably mounting each central plate to its associated outer plate.

4. The conveyor assembly as defined in claim 3, wherein said wear strips are of rectangular cross section and formed of ultra high molecular weight linear polypropylene.

5. The conveyor assembly as defined in claim 4, wherein the trailing section of said guide ramp is inclined downwardly approximately 15° from said horizontal leading section.

6. A conveyor assembly for articulated link conveyor, of the type having individual links with downwardly extending opposed feet, comprising:

a stationary frame having substantially vertical side walls;

an elongated guide ramp securely supported by said frame for guiding the links on an upper flight track of the conveyor assembly, said guide ramp comprising:
  (a) a pair of opposed laterally spaced elongated outer plates, each plate having a bend along its entire length such that one side of each outer plate fits essentially flush against a side wall of the frame and is mounted to said side wall, and a second side of each outer plate projects inwardly toward the opposing outer plate;
  (b) a pair of opposed laterally spaced elongated central plates, each plate of essentially the same length of the outer plates and each central plate adjustably mounted to said inwardly projecting second side of an associated outer plate such that each central plate projects inwardly toward the opposing central plate;
  (c) a pair of opposed laterally spaced elongated wear strips, each wear strip of essentially the same length of the central plates, and each wear strip securely attached to an associated central plate such that each wear strip projects inwardly toward the opposing wear strip whereby an appropriate clearance is provided between said opposing wear strips to provide a guide path for said links; and whereby each plate and wear strip has a horizontal leading section and a downwardly inclined trailing section; and protective and supportive means operably associatable with said guide ramp for preventing items being transported on said links from falling into a drive mechanism and for protecting the operator's hands and fingers, said protective and supportive means including a coverplate substantially on the same plane as the links being horizontally guided by the leading section of the guide ramp, said coverplate supported by the frame and separated from the conveyor links by a small clearance, at a point where the leading section meets the trailing section, so that when items descend from the horizontal leading section they are urged onto said coverplate.

7. The conveyor assembly as defined in claim 6, wherein each of said central plates includes a plurality of lateral slots for insertion of bolts for adjustably mounting each central plate to its associated outer plate.

8. The conveyor assembly as defined in claim 7, wherein said wear strips are of rectangular cross section and formed of ultrahigh molecular weight linear polypropylene.

9. The conveyor assembly as defined in claim 8, wherein said drive mechanism includes a motor beneath a sprocket, which drives said links, driving said sprocket by a means of a drive train.

* * * * *